US009130630B2

United States Patent
Xu et al.

(10) Patent No.: US 9,130,630 B2
(45) Date of Patent: Sep. 8, 2015

(54) METHODS AND SYSTEMS FOR DETERMINING INDICATORS USED IN CHANNEL STATE INFORMATION (CSI) FEEDBACK IN WIRELESS SYSTEMS

(71) Applicant: Marvell World Trade Ltd., St. Michael (BB)

(72) Inventors: Mingguang Xu, Sunnyvale, CA (US); Yakun Sun, Sunnyvale, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/310,281

(22) Filed: Jun. 20, 2014

(65) Prior Publication Data

US 2014/0376653 A1    Dec. 25, 2014

Related U.S. Application Data

(60) Provisional application No. 61/837,997, filed on Jun. 21, 2013.

(51) Int. Cl.
*H04L 1/02*    (2006.01)
*H04B 7/06*    (2006.01)
*H04B 7/04*    (2006.01)
*H04L 25/03*    (2006.01)

(52) U.S. Cl.
CPC ............ *H04B 7/0626* (2013.01); *H04B 7/0413* (2013.01); *H04B 7/0456* (2013.01); *H04B 7/0478* (2013.01); *H04B 7/065* (2013.01); *H04B 7/0617* (2013.01); *H04L 25/03343* (2013.01); *H04L 25/03898* (2013.01); *H04L 25/03955* (2013.01); *H04B 7/063* (2013.01); *H04B 7/0632* (2013.01); *H04B 7/0639* (2013.01)

(58) Field of Classification Search
CPC ...... H04L 1/0618; H04L 1/06; H04B 7/0417; H04B 7/0456
USPC .......... 375/267, 299, 260, 347; 370/335, 338, 370/342, 348; 455/434, 453, 525
See application file for complete search history.

(56) References Cited

U.S. PATENT DOCUMENTS 7,899,405 B2 *   3/2011   Han et al. .......................... 455/69
8,681,627 B2 *   3/2014   Choudhury et al. .......... 370/235
8,913,683 B2 *  12/2014   Nammi ......................... 375/267

* cited by examiner

*Primary Examiner* — Khai Tran

(57) ABSTRACT

Systems and methods are provided for determining channel state information (CSI) at a receiver for feedback to a transmitter to indicate properties of the communication channel. A signal is received at a receiver over a communication channel. An optimization value is determined based on the received signal and a plurality of matrix indicators. An amount of change in wideband properties of the communication channel is determined from the optimization value. Based on the determined amount of change, a CSI including a selected type indicator and a selected subset of the plurality of the matrix indicators is selected.

20 Claims, 6 Drawing Sheets

| Mode | PUCCH 2-1 | | |
|---|---|---|---|
| Reporting Format | RI, PTI | | |
| | PTI=0 | PTI=1 | |
| | PMI $i_1$ | Wideband CQI Subframe | Wideband CQI Subframe |
| | Wideband CQI, Wideband PMI $i_2$ Subband CQI Subframe | Wideband CQI, Wideband PMI $i_2$ | Subband CQI, Subband PMI $i_2$ |

FIG. 3

METHODS AND SYSTEMS FOR DETERMINING INDICATORS USED IN CHANNEL STATE INFORMATION (CSI) FEEDBACK IN WIRELESS SYSTEMS

CROSS-REFERENCE TO RELATED APPLICATION

This application claims benefit under 35 U.S.C. §119(e) of U.S. Provisional Application No. 61/837,997, filed Jun. 21, 2013, which is hereby incorporated herein by reference in its entirety.

FIELD OF USE

This disclosure relates generally to communication systems, and more particularly to selecting channel state information (CSI) at a receiver for use in a precoder at a transmitter.

BACKGROUND

In a multiple input-multiple output (MIMO) data communication system, it is desirable for information, often grouped into packets to be accurately received at a destination. A transmitter at or near the source precedes the information according to parameters of a codebook and transmits the preceded information in a signal on a communication channel. The communication channel includes wideband properties and narrowband properties, both of which may vary over time. Depending on the used channel bandwidth that determines properties of the channel that are changing, a subset instead of a full set of the precoder parameters may be adjusted at the transmitter for a subsequent transmission to maintain a quality of the transmitted signal when received by a receiver.

A receiver at or near the destination processes the signal sent by the transmitter to determine the wideband and narrowband properties of the communication channel, and to further determine whether the wideband or narrowband properties are changing over a time interval. Based on which of the wideband or narrowband properties have changed over an interval, the receiver selects channel state information (CSI) to feed back, to the transmitter. Based on the CSI selected by the receiver, the transmitter adjusts parameters for transmission of a subsequent signal, e.g., a precoder for preceding a subsequent signal, and the modulation and coding scheme (MCS).

SUMMARY

In view of the foregoing, systems and methods are provided for determining channel state information (CSI) at a receiver for feedback, to a transmitter to indicate properties of the communication channel.

In some embodiments, CSI is determined at a receiver in a multiple input-multiple output (MIMO) transmission system. A signal is received at a receiver over a communication channel. An optimization value is determined based on the received signal and a plurality of matrix indicators. An amount of change in wideband properties of the communication channel is determined from the optimization value. Based on the determined amount of change, a CSI including a selected type indicator and a selected subset of the plurality of the matrix indicators is selected.

BRIEF DESCRIPTION OF THE DRAWINGS

The above and other aspects and potential advantages of the present disclosure will be apparent upon consideration of the following detailed description, taken in conjunction with the accompanying drawings, in which like reference characters refer to like parts throughout, and in which:

FIG. 3 is a reporting format that is used to transmit information about a CSI from a receiver to a transmitter, in accordance with embodiments of the present disclosure;

DETAILED DESCRIPTION

The present disclosure generally relates to selecting channel state information (CSI) in a multiple input-multiple output (MIMO) communication system. In particular, systems and methods are described for selecting a CSI at a receiver to feed back information about a communication channel to a transmitter. A communication channel generally includes wideband and narrowband properties, both of which may vary over a time interval. A transmitter in a MIMO system may use parameters from a nested codebook to precode transmissions, based on whether the wideband properties or the narrowband properties of the communication channel are changing. The nested codebook is organized into layers, with higher layers corresponding to wideband properties and coarser granularity in bandwidth and spatial direction of the communication channel, and lower layers corresponding to narrowband properties and finer granularity in bandwidth and spatial direction of the communication channel.

If wideband properties of the communication channel are changing over a time interval, parameters from higher layers of the nested codebook corresponding to the wideband properties should be adjusted prior to sending a transmission. If narrowband properties of the communication channel are changing, parameters from the lower layers of the nested codebook corresponding to the narrowband properties should be adjusted prior to sending a transmission. In order for the transmitter to select and adjust parameters from the nested codebook for preceding a signal, information about the wideband properties and narrowband properties of the communication channel are communicated as feedback to the transmitter.

Figure 1:
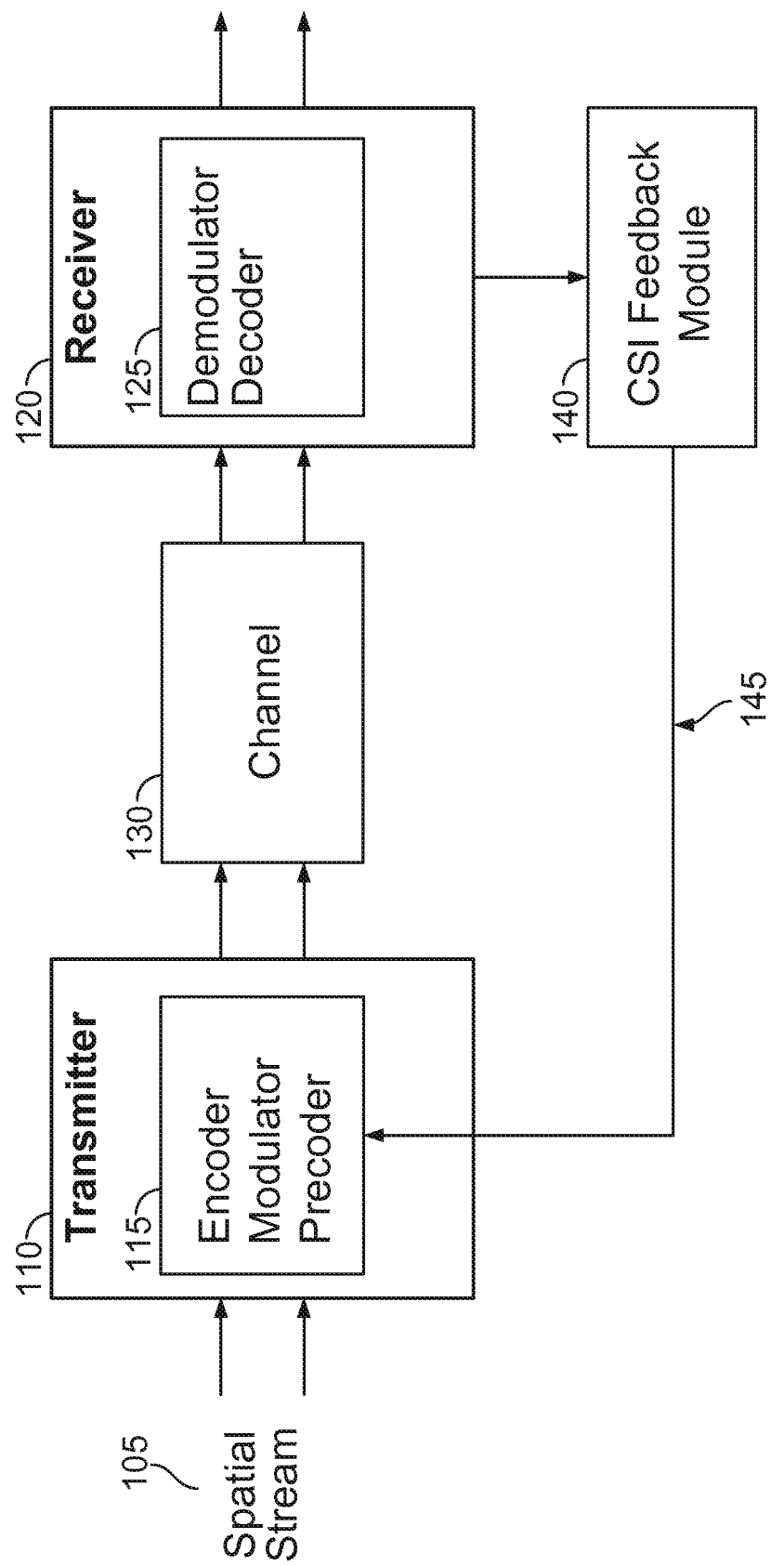
FIG. 1 is a high level block diagram of a data communication system, in accordance with embodiments of the present disclosure.

FIG. 1 is a simplified block diagram of a communication system 100 that selects a CSI in accordance with some embodiments. Communication system 100 includes a transmitter 110, a channel 130 and a receiver 120. As referred to herein, channel or communication channel may refer to any physical medium, physical layer communication protocol, logical mode, or logical communication protocol used for communicating data in a communication system. In some embodiments, data to be transmitted may be divided between a number of spatial streams 105. For example, a spatial stream may correspond to one subcarrier that, carries data in a particular frequency range, or a tone. In some embodiments, the system 100 may represent a wireless communication system. In these embodiments, transmitter 110 may be a cellular base station or a wireless router and receiver 120 may be a wireless device such as a mobile telephone, hotspot, laptop, handheld device, or other such mobile or portable device. The components shown in transmitter 110 and receiver 120 may be implemented by a single integrated circuit (IC) or as separate components in a circuit board or implemented on a programmable logic device. These components may be implemented on separate devices or circuits and networked together.

Transmitter 110 communicates with receiver 120 through channel 130. Transmitter 110 and receiver 120 may each include one or more antennas. In a wireless communication system, channel 130 may be the physical space between the antennas of transmitter 110 (referred to as "transmit antennas" below) and the antennas of the receiver 120 (referred to as "receiver antennas" below), which obstructs and attenuates the transmitted signals due to at least time varying multipath fades and shadowing effects. One or more additive noise sources z may, for example, be ambient electromagnetic interference. In some scenarios, the one or more noise sources z may be modeled as additive white Gaussian noise (AWGN) with zero mean.

Transmitter 110 may include one or more encoders, modulators and precoders 115 to process information bit sequences for transmission. For example, a precoder may be used to precede information sequences or a spatial stream for transmission in a MIMO system. Although the present disclosure is described in terms of binary data, it is understood that bit sequences may be replaced with a sequence of non-binary digits or another type of information-containing symbol without departing from the scope of the present disclosure. In some embodiments, the encoder employs error correction or error detection codes to encode bit sequences. For example, the encoder may encode bit sequences using CRC code, convolutional code, Turbo code, LDPC code, or any other suitable code. The modulator may modulate the bit sequences or the encoded bit sequences based on any appropriate modulation scheme, such as quadrature amplitude modulation (QAM), pulse amplitude modulation (PAM), or phase shift keying (PSK). The encoder, modulator, and precoder 115 may be implemented using separate processors or the same processor.

Receiver 120 may receive signals through one or more receiver antennas. Receiver 120 may process the received signals to produce an output bit sequence. For example, receiver 120 may perform demodulation, and decoding to produce the output bit sequence. Receiver 120 may include one or more demodulators, and decoders 125. Alternatively, an output bit sequence may be directed to a demodulator, a decoder or any combination thereof, external to receiver 120.

When transmitter 110 includes multiple transmit antennas and receiver 120 includes multiple receive antennas, channel 130 may be referred to as a MIMO channel. Due to noise and/or attenuation effects, wideband properties relating to a wide bandwidth and coarse resolution in spatial directions of channel 130, and narrowband properties relating to a narrow bandwidth and fine resolution in spatial directions of channel 130 may change over time.

Transmitter 110 may send pilot input information to receiver 120 through channel 130. Pilot information may include one or more pilot signals, i.e., signals that are known to the receiver. Receiver 120 includes circuitry that may perform demodulation, decoding, or any combination thereof. The demodulator, and decoder in receiver 120 may process a received pilot information signal to determine wideband and narrowband properties of the channel 130 and to generate CSI feedback, using CSI feedback module 140, for feedback to transmitter 110 along path 145, which may be any suitable communication channel. Transmitter 110 includes a precoder, an encoder, a modulator, or any combination thereof. The precoder may receive the CSI feedback information from path 145 and dynamically select and adjust parameters from the nested codebook for use in preceding a subsequent transmission and adjust the MCS. Although system 100 has been illustrated with transmitter 110 and receiver 120 as separate devices, it should be understood that transmitter 110 and receiver 120 may be part of the same device.

CSI feedback includes one or more of a channel quality indicator (CQI), a preceding matrix indicator (PMI), a rank indicator (RI), and a preceding type indicator (PTI). Selection of some parts of the CSI feedback, including the CQI, PMI and RI, depend on the currently observed channel(s) H. For example, the PMI may be modeled by:

$$PMI = \max_{k \in \Omega} f(H, PMI_k) \qquad (EQ.\ 1)$$

where $\Omega$ denotes codebook, H is a model for one or more currently observed channels H, and f is an optimization function over the set of preceding matrix indicators, $PMI_k$. Selection of some parts of the CSI feedback, such as the PTI, depends on currently observed channels, and/or other causal/non-causal information. For example, selection of the PTI may depend on feedback in the past, predictions of future channels, channel statistics (e.g., how quickly properties of a channel changes over time), associated future precoder feedback given a PTI, a transmission scheme (e.g., wideband/narrowband transmission) in the future, or any suitable combination thereof. For example, the PTI may be modeled by:

$$PTI = \max_{PTI_k \in \theta} f(H, CSI^{(last\ reported)}, H^{(future)}, CSI^{(future)}, PTI_k) \qquad (EQ.\ 2)$$

where $\theta$ denotes the set of all possible preceding types, H is a model for one or more currently observed channels, $CSI^{(last\ reported)}$ is a last reported CSI feedback from a receiver, $H^{(future)}$ is a model for one more predicted future channels, $CSI^{(future)}$ is a predicted CSI, $PTI_k$ is a PTI corresponding to index k, and f is an optimization function over the set of $PTI_k$. Although EQ. 2 has been written as an optimization function with an optimization value and parameter of PTI, it should be understood that PTI may be replaced by any other indicator for selecting and adjusting parameters of a codebook for use by a precoder. The optimization value can be an objective value used in an optimization technique.

Figure 2:
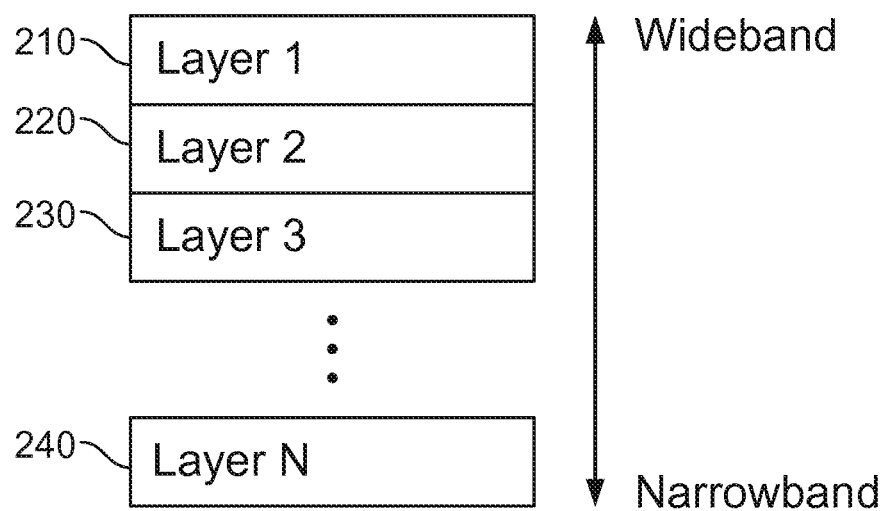
FIG. 2 is a diagram of a codebook used in a precoder, in accordance with embodiments of the present disclosure.

FIG. 2 is a diagram of a codebook 200, in accordance with embodiments of the present disclosure. Codebook 200 may be a nested codebook or any other suitable codebook that, includes N layers or stages, where N may be 2 or more. Codebook 200 includes a first layer 1, labeled 210, a second layer 2, labeled 220, a third layer 3, labeled 230, up to an Nth layer N, labeled 240. Each layer of the codebook corresponds to parameters used by a precoder of transmitter 110 to precede signals for transmission. The higher layers of the codebook correspond to wider band properties of the channel and coarser granularity in bandwidth and spatial direction across longer time periods. The lower layers of the codebook correspond to narrower band properties of the channel and finer granularity in bandwidth and spatial direction across shorter timer periods. The granularity in bandwidth and spatial direction progressively becomes finer towards the lower layers of the codebook.

Less feedback information is communicated from a receiver 120 if only higher-layer precoder indicators are reported via feedback from, a receiver, because lower-layer precoder indicators would not be reported. A transmitter is able to precede a signal based on parameters for one or more higher codebook layers, without parameters for lower layers. However, the signal preceded based on adjusted parameters of higher-layers will have coarse granularity in bandwidth and spatial direction. If the precoder indicator in higher-layers is known, the same as, or similar to a last reported, higher-layer precoder indicator, for example, if there is a small change in wideband, properties of a communication channel, finer granularity in bandwidth and spatial direction can be achieved by feeding back, from the receiver 120, precoder indicators in lower layers.

The Long-Term Evolution (LTE) Release 10 and later standards documents for cellular communications describe an example of the use of CSI feedback. In particular, a system for communicating CSI feedback from a user equipment (UE) to a cellular base station is described in standards document 3GPP TS 36.213 version 11.6.0 Release 11, which is hereby incorporated herein by reference in its entirety. The standard describes a transmission mode 9 in which CSI is determined based on measurements of one or more channel state information-reference signals (CSI-RS), where each CSI-RS corresponds an antenna port. In transmission mode 9, there may be up to eight CSI-RS antenna ports. When there are eight CSI-RS antenna ports, two preceding matrix indicators (PMI $i_1$, PMI $i_2$) are used to index each of two layers in a two layer codebook. PMI $i_1$ indicates wideband frequency properties and long-term time properties of a channel and corresponds to a highest first layer in the two layer codebook. PMI $i_2$ indicates narrowband frequency properties and short-term time properties of a channel and corresponds to a lowest second layer in the two layer codebook condition on any given PMI $i_1$. Although PMI $i_1$ generally corresponds to wideband properties and PMI $i_2$ generally corresponds to narrowband properties, it should be understood that PMI $i_1$ or PMI $i_2$ itself cannot specify any particular precoder in the codebook, and the codebook is indexed by the combination of (PMI $i_1$, and PMI $i_2$).

If PMI $i_1$ does not change across two reporting intervals, PMI $i_2$ can be reported to further tune a spatial direction indicated by PMI $i_1$. In the CSI report mode of the Physical Uplink Control Channel (PUCCH) mode 2-1, a user equipment (UE) can enable or disable PMI $i_1$ reporting and can indicate this by feeding back different preceding type indicators (PTI). In this reporting mode, PTI values may be 0 or 1.

FIG. 3 illustrates a reporting format 300 that is used to transmit information about a CSI from a receiver to a transmitter, in accordance with embodiments of the present disclosure. For example, the reporting format 300 may be used to report CSI in an LTE cellular system, from a mobile device having a number of CSI-RS antenna ports greater than 1, using PUCCH mode 2-1 and configured with PMI/RI reporting. The PTI value in this system can either be 0 or 1, and is used to determine whether to feedback a wideband PMI $i_1$ value or a narrowband PMI $i_2$ value in a next PTI feedback interval.

In the reporting format 300, CQI, PMI, RI and PTI are reported periodically during a first period. 310, a second period 320, and a third period 330. The first period 310 is associated with a subframe for RI and PTI reporting, the second period 320 is associated with a subframe for wideband CQI reporting, and the third period 330 is associated with a subframe for subband CQI reporting. During first period 310, RI and PTI are reported from a receiver 120 to a transmitter 110. Depending on the PTI selected and reported in period 310, different information is subsequently reported during second period 320 and third period 330. A PTI value of 0 indicates feedback of wideband PMI ix information and a PTI value of 1 indicates feedback of narrowband PMI $i_2$ information. The narrowband PMI $i_2$ value is also referred to as a subband PMI $i_2$ value. If a first information unit 315, including a PTI value of 0, is reported in a subframe for RI and PTI reporting associated with first period 310, a second information unit 325, including a value PMI $i_1$ is reported in a subframe for wideband CQI reporting associated with second period 320, and a third information unit 335, including a wideband CQI and a wideband PMI $i_2$ value, is reported in a subframe for subband CQI reporting associated with third period 330.

Alternatively, if a first information unit 317, including a PTI value of 1, is reported in a subframe for RI and PTI reporting associated with first period 310, a second information unit 327, including a wideband CQI and a wideband PM $i_2$, is reported in a subframe for wideband CQI reporting associated with second period 320, and third information unit 337, including a subband CQI and a subband PMI $i_2$, is reported in a subframe for subband CQI reporting associated with third period 330.

Figure 4:
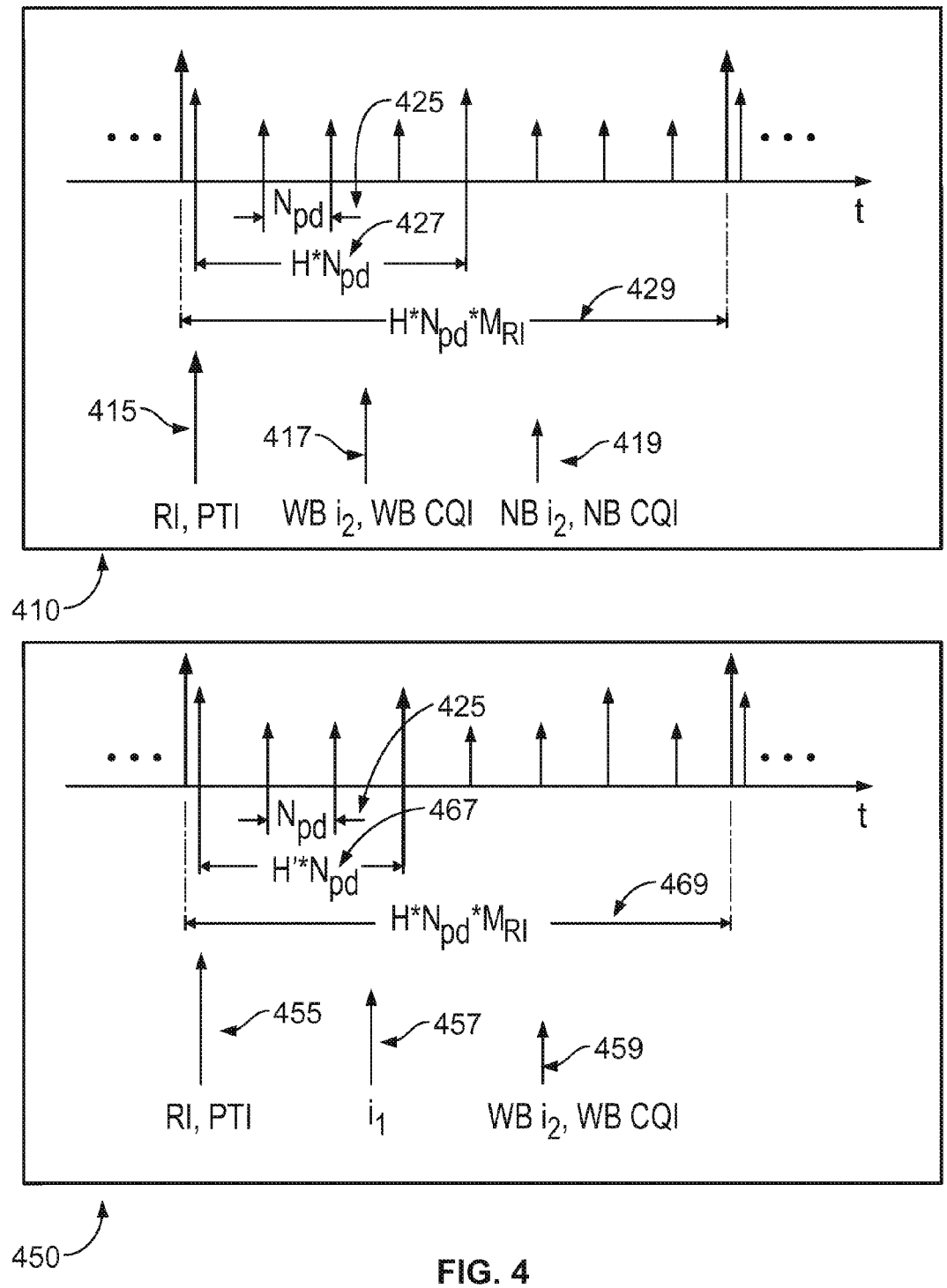
FIG. 4 is a diagram of timelines for transmitting a CSI including wideband properties and a CSI including narrowband properties, in accordance with embodiments of the present disclosure.

FIG. 4 is a diagram of timelines 410 and 450 for transmitting CSI, including an RI value, a PTI value, a PMI value and a CQI value. Timeline 410 corresponds to a selection and transmission of a PTI value of 1. Timeline 450 corresponds to a selection and transmission of a PTI value of 0.

When a PTI value of 1 is selected, RI and PTI are reported in a first information unit 415, corresponding to first, information unit. 317 and first period 310 of FIG. 3. The first information unit 415 is reported with a periodicity 429 of $H*N_{pd}*M_{RI}$ where H is an integer based on a number of bandwidth parts, $N_{pd}$ is a periodicity determined as a multiple of subframes, and $M_{RI}$ is a predetermined periodicity. A wideband CQI and a wideband PMI $i_2$ value is reported in a second information unit 417, corresponding to the second information unit 327 and second period 320 of FIG. 3. The second information unit 417 is reported with a periodicity 427 of $H*N_{pd}$. A narrowband CQI and a narrowband PMI $i_2$ value is reported in a third information unit 419, corresponding to the third information unit 337 and third period 330 of FIG. 3. The third information unit 419 is reported with a periodicity 425 of $N_{pd}$.

When a PTI value of 0 is selected, RI and PTI are reported in a first information unit 455, corresponding to first information unit 315 and first period 310 of FIG. 3. The first information unit 455 is reported with a periodicity 469 of $H*N_{pd}*M_{RI}$ where H is an integer based on a number of bandwidth parts, $N_{pd}$ is a periodicity determined as a multiple of subframes, and $M_{RI}$ is a predetermined periodicity. A PMI $i_1$ value is reported in a second information unit 457, corresponding to the second information unit 325 and second period 320 of FIG. 3. The second information unit 457 is reported with a periodicity 467 of $H'*N_{pd}$, where H' is predetermined. A wideband CQI and a wideband PMI $i_2$ value is reported in a third information unit 459, corresponding to the third information unit 335 and third period 330 of FIG. 3. The third information unit 459 is reported with a periodicity 425 of $N_{pd}$.

There exist multiple methods of selecting CSI, and more specifically, the PTI, depending on the type of transmission and the amount of change in wideband or narrowband properties of the communication channel. For wideband transmissions, feedback of a PTI value of 0 may be favored because PMI $i_1$, which provides information about wideband frequency properties and long-term, time properties of the communication channel, is communicated when a PTI value is 0. Additionally, narrowband frequency properties and short-term time properties of the communication channel, which are indicated by the subband PMI $i_2$ (communicated when a PTI value is 1), do not improve wideband transmissions. For narrowband transmissions sent within a time interval over which wideband properties of the communication channel have not changed (e.g., the PMI $i_1$ value has not changed), a PTI value of 1 may be favored because PMI $i_1$ does not need to be updated, and updates to narrowband frequency properties and short-term time properties of the communication channel, which are indicated by the subband PMI $i_2$ (communicated when a PTI value is 1), help to improve transmission.

If CSI is reported from the transmitter to the receiver over relatively long periods, a PTI value of 0 is favored in order to feed back wideband properties and long-term, time properties of the communication channel, as indicated by PMI $i_1$. For example, in reference to FIG. 4, if periodicity 469 of the reporting of the PTI is long compared to periodicity 425, then selecting a PTI value of 0 is favored.

Selection of optimal PTI feedback can be cast as a decision problem involving value functions, reward functions, actions, states, and probabilities of state transitions. The time horizon for selection of feedback may be the time t=1, . . . , T. A channel state at time t may be represented as:

$$H(t,i), 1 \leq i \leq N; PMI_{i_1}(t) \ldots PMI_{i_L}(t) \quad \text{(EQ. 3)}$$

where H is a model for one or more currently observed channels at time t (e.g., a channel matrix over time), i is an index, $PMI_{i_m}(t)$ is a PMI $i_m$ value at time t, m=1, . . . , L refers to an index to a layer of a nested codebook layer where m=1 refers to the highest layer and m=L refers to the lowest layer. The value H may refer to a state of the communication channel. The decision problem may then be framed as an optimization function involving a reward function V by:

$$V_t(H(t); PMI_{i_1}(t) \ldots PMI_{i_L}(t)) = \quad \text{(EQ. 6)}$$
$$\max_{PTI \in \theta} \left[ R(H(t); PMI_{i_1}(t) \ldots PMI_{i_L}(t); PMI) + \int V_{t+1}(H(t+1); PMI_{i_1}(t+1) \ldots PMI_{i_L}(t+1)) dF(H(t+1)) \right]$$

where $V_t$ is a total reward remaining in the time horizon until T and observed at time t, PTI is the PTI value to be determined, $\theta$ is the set of possible PTI values (e.g., 0 and 1), R is the immediate reward received in a next interval after selecting a value of PTI, and F is a probability distribution of channels in a next decision time interval. All other parameters are the same as described in reference to EQ. 3. The value $V_t$ may also be referred to as an optimization value. Additionally, the value $V_t$ may be referred to as a current optimization value (e.g., representing a reward at time t), while the value $V_{t+1}$ may be referred to as a predicted optimization value (e.g., representing a reward at time t+1). The value R may be referred to as a reward function or a current optimization parameter.

In the context of the LTE cellular standard, a problem, may be deciding between (a) using a relatively outdated PMI $i_1$ and feeding back information about narrowband properties of a channel, or (b) feeding back information about wideband properties of a channel and not feeding back information about narrowband properties of a channel. The relatively outdated PMI $i_1$ may be used if the wideband properties of a communication channel have not changed significantly over time. In reference to EQ. 4 above, a PTI value of 1 may be selected if a first value $V_t$ computed with a PTI value of 1 is higher than a second value $V_t$ computed with a PTI value of 0. Alternatively, a PTI value of 0 may be selected if the second value $V_t$ computed with a PTI value of 0 is higher than a first value $V_t$ computed with a PTI value of 1.

In some embodiments, the optimization function described in EQ. 4 may be modified to include a scaling coefficient to a predicted, optimization value. For example, the optimization function may be:

$$V_t(H(t); PMI_{i_1}(t) \ldots PMI_{i_L}(t)) = \quad \text{(EQ. 5)}$$
$$\max_{PTI \in \theta} \left[ R(H(t); PMI_{i_1}(t) \ldots PMI_{i_L}(t); PMI) + \alpha \left( \int V_{t+1}(H(t+1); PMI_{i_1}(t+1) \ldots PMI_{i_L}(t+1)) dF(H(t+1)) \right) \right]$$

where $\alpha$ is a scaling coefficient ranging from 0 to 1. When $\alpha$ is 0, the value function $V_t$ depends on a local window involving the immediate reward R. When $\alpha$ is 1, the value function $V_t$ is identical to the solution identified in EQ. 4. Adjusting $\alpha$ between 0 and 1 adjusts the relative weight of the immediate reward R and the predicted value $V_{t+1}$.

In some embodiments, the optimization function described, in EQ. 4 may be averaged over an interval T. For example, the optimization function may be:

$$V_t(H(t); PMI_{i_1}(t) \ldots PMI_{i_L}(t)) = \quad \text{(EQ. 6)}$$
$$\max_{PTI \in \theta} \left[ \frac{1}{T} R(H(t); PMI_{i_1}(t) \ldots PMI_{i_L}(t); PMI) + \frac{1}{T-t} \left( \int V_{t+1}(H(t+1); PMI_{i_1}(t+1) \ldots PMI_{i_L}(t+1)) dF(H(t+1)) \right) \right]$$

where T is a time interval over which the optimization function may be evaluated. The value T may be the same as the maximum value T of the time horizon, described, in reference to EQ. 3. In the optimization function of EQ. 6, R or the current optimization parameter may be divided by a first time interval T, and $V_{t+1}$ the predicted optimization value may be divided by a second time interval T−t, where t is a current, time.

In some embodiments, the optimization value V and the optimization parameter R can be chosen as achievable data throughput, capacity, outage capacity, mutual information or any other possible form, for information/data rate measure. V and R may also be referred to as reward functions. For example, the function R may be chosen as capacity by:

$$R = \log_2(1 + SNR(H(t); PMI_{i_1}(t) \ldots PMI_{i_L}(t); PTI)) \quad \text{(EQ. 7)}$$

where SNR is a measure of signal-to-noise ratio, and other parameters are the same as defined with reference to EQ. 3. For example, the function R may be chosen as throughput by:

$$R(H(t); PMI_{i_1}(t) \ldots PMI_{i_L}(t); PTI) = \text{Throughput}(H(t); PMI_{i_1}(t) PMI_{i_L}(t); PTI) \quad \text{(EQ. 8)}$$

where throughput is a measure of data throughput in the channel based on parameters defined, with reference to EQ. 3.

The throughput is based on a model of the channel H, a set of $PMI_{i_m}(t)$ corresponding to a nested codebook, and a selected PTI value. The reward functions V and R may be selected, to handle future or predicted transmission schemes (e.g., wideband or narrowband) by maximizing an average (e.g., expectation) of all possible future transmission schemes relative to a PTI parameter. The reward functions V and R may also be selected to maximize the worst case scenario.

EQ. 1 to EQ. 8 provide a framework of using optimization functions to select CSI for feedback. Optimal and sub-optimal solutions to the feedback are explored. Given a binary set of PTI values (e.g., 0 and 1), an optimal feedback strategy is given by:

$$\text{If } \left[R(H(t); PMI_{i_1}(t), PMI_{i_2}(t); PMI = 1) + \int V_{t+1}(H(t+1); PMI_{i_1}(t+1), PMI_{i_2}(t+1)) dF(H(t+1))\right] > \left[R(H(t); PMI_{i_1}(t), PMI_{i_2}(t); PMI = 0) + \int V_{t+1}(H(t+1); PMI_{i_1}(t+1), PMI_{i_2}(t+1)) dF(H(t+1))\right] \quad \text{(EQ. 9)}$$

Then set "PTI = 1";
Otherwise set "PTI = 0";

The optimal solution may be solved using various dynamic programming techniques.

If the channel H is stationary in time (e.g., time invariant), then the optimal PTI does not depend on time t. In real-world systems, the channel H is likely to vary time with time and must be modeled by a stochastic process. For example, a channel H may be modeled as a Markovian process by:

$$F(H(t+1)|(H(\tau), 1 \leq \tau \leq t) = F(H(t+1)|(H(t)) \quad \text{(EQ. 10)}$$

Obtaining the full solution may be computationally intensive and not practical for implementation in mobile devices that may have limited processing power, for example, at receiver 120.

The optimization functions described in reference to, for example, EQ. 4 to EQ. 6, may be solved using suboptimal solutions that constrain the problem in time horizon, frequency range or any other suitable constraint. In some embodiments, a suboptimal solution maximizes a reward or optimization parameter in an interval preceding a next feedback report. For example, in reference to EQ. 5 above, α may be set to 0, thereby reducing the problem to evaluation over the optimization parameter or reward function R.

In some embodiments, a suboptimal solution evaluates upper layers of a codebook instead of all layers in a codebook. For example, the reward function may be:

$$R = \log_2(1 = SNR(H(t); PMI_{i_1}(t); PTI)) \quad \text{(EQ. 11)}$$

whereby the preceding matrix parameters are constrained to $PMI_{i1}$, the highest, layer of the codebook, instead of all layers of the codebook. In this way, the suboptimal solution checks if wideband properties associated with the highest layer of the codebook have changed. For example, in an LTE system with 8 antennas, selection of the PTI may be determined by:

$$PTI = \begin{cases} 1, & \text{distance}(PMI\ i_1^{(last\ reported)}, PMI\ i_1^{(inferred)}) \leq t_d \\ 0, & \text{otherwise} \end{cases} \quad \text{(EQ. 12)}$$

where $t_d$ is a threshold that depends on channel statistics and implementation. If $t_d = 0$, then the selection of the PTI value depends on the change in PMI $i_1$, corresponding to the highest layer in the codebook, and wideband properties of a communication channel. The value $t_d$ may be determined from channel statistics. For example, $t_d$ may be a function of the coherence time in spatial domain, or the Doppler spectrum of the channels. The distance function can be a Chordal distance, Euclidean distance, difference between the PMI $i_1^{(last\ reported)}$ and PMI $i_1^{(last\ inferred)}$ values, or any other suitable distance function. For example, the difference between PMI $i_1$ values may be given by:

$$\text{distance}(PMI i_1^{(last\ reported)}, PMI\ i_1^{(inferred)}) = |PMI\ i_1^{(last\ reported)}, PMI\ i_1^{(inferred)}| \quad \text{(EQ. 13)}$$

where the "||" symbol refers to an absolute value operator.

In some embodiments, a suboptimal solution considers all layers of a codebook used in a precoder. For example, the reward function can be defined by:

$$R(PTI) = \log_2(1 + SNR(H(t); PMI_{i_1}(t) \ldots PMI_{i_L}(t); PTI)) \quad \text{(EQ. 14)}$$

Other forms of metrics may also apply, such as throughput, mutual information, or any other suitable metric. Given the reward function of EQ. 14, the PTI is selected to maximize the gain within a next interval, counting the contributions of all layers of the codebook. The selection of the PTI may be described by:

$$PTI = \underset{PTI \in \theta}{\text{argmax}}\ R(PTI) = \underset{PTI \in \theta}{\text{argmax}} \log_2(1 + SNR(H(t); PMI_{i_1}(t) \ldots PMI_{i_L}(t); PTI)) \quad \text{(EQ. 15)}$$

In this suboptimal solution, a predicted optimization value is not used. For example, in reference to EQ. 5, the scaling coefficient α may be set to 0.

Figure 5:
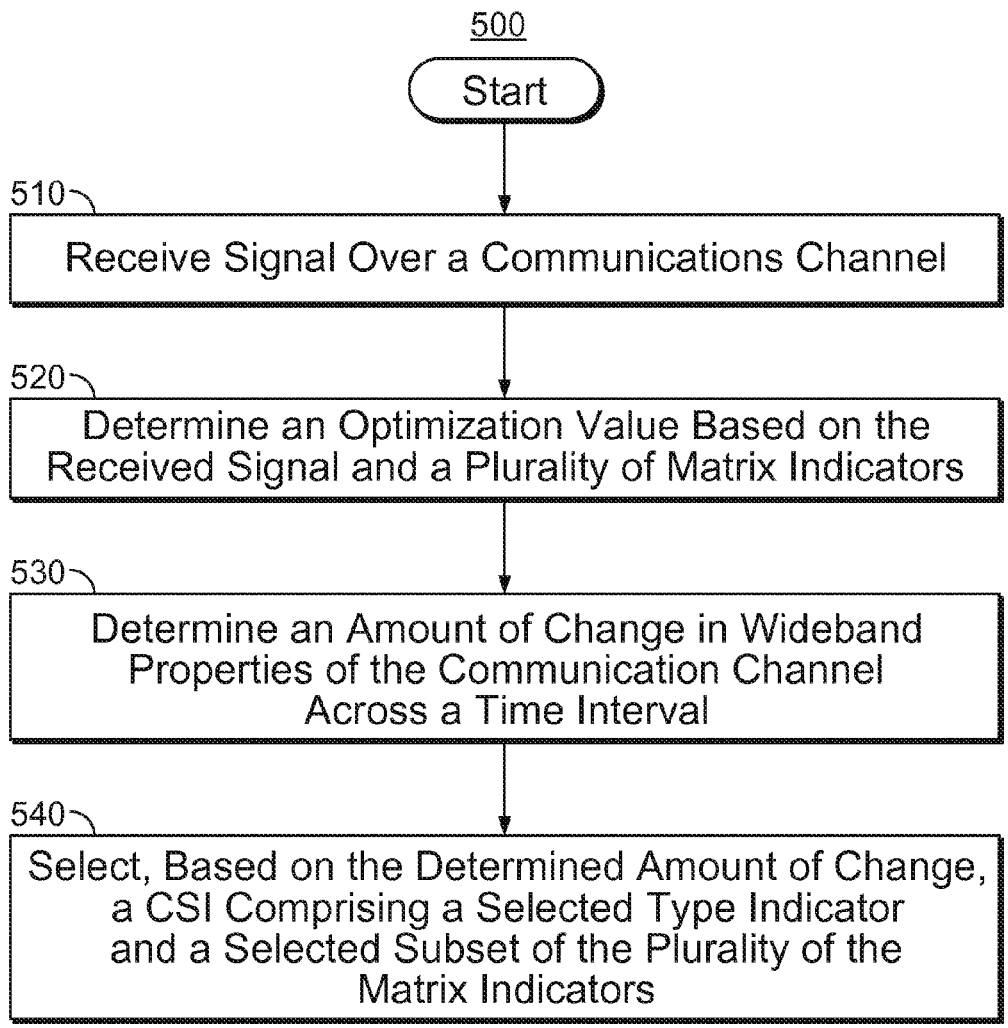
FIG. 5 is a flow chart of a process for performing a selection of a CSI, in accordance with embodiments of the present disclosure.

FIG. 5 is a flow diagram illustrating a process 500 for selecting a CSI, in accordance with embodiments of the present disclosure. Process 500 includes steps 510, 520, 530, and 540, and may be implemented by receiver 120.

At 510, a receiver 120 receives a signal over a communication channel. For example, a receiver 120 may receive a pilot signal over channel 130, where the pilot signal includes one or more spatial streams that have been preceded, encoded, and modulated by encoder, modulator, and precoder 115 at a transmitter 110. The precoding of the spatial streams may nave been performed based on parameters from one or more layers of a codebook, as illustrated in FIG. 2.

At 520, receiver 120 determines an optimization value based on the received signal and a plurality of matrix indicators. Receiver 120 may determine the optimization value based on any of the optimization functions described in EQ. 1 to EQ. 3. In some embodiments, receiver 120 may determine the optimization value using a full solution by employing dynamic programming techniques. In some embodiments, receiver 120 may determine the optimization value using a sub-optimal solution as described in EQ. 11 to EQ. 15.

At 530, receiver 120 determines an amount of change in wideband properties of the communication channel across a time interval. Receiver 120 may determine one or more preceding matrix indicator (PMI) based on the signal received in step 510. In some embodiments, the receiver may make the determination using a sub-optimal solution. For example, in a system using a 2 layer codebook, receiver 120 may determine a $PMI_{i1}$ and a $PMI_{i2}$ corresponding to a first layer of the codebook, and a second layer of the codebook, respectively.

The receiver 120 may compare a first set of the determined $PMI_{i1}$ and $PMI_{i2}$ values for a current interval, to a second set of $PMI_{i1}$ and $PMI_{i2}$ values for an interval immediately preceding the current interval. The receiver 120 may determine an amount of change as a distance described in reference to EQ. 13.

At 540, receiver 120 selects, based on the determined amount of change, a CSI comprising a selected type indicator and a selected subset of the plurality of matrix indicators. Receiver 120 may compare the distance determined in reference to EQ. 13, to a threshold $t_d$ as described in reference to EQ. 12. For example, if the distance is below a threshold, then wideband properties of a communication channel 130 may not have changed sufficiently since the prior reporting interval. The receiver 120 selects a PTI value of 1 to feedback information about narrowband properties of the channel. The receiver 120 then proceeds to feed back the selected PTI in a first period 310, a wideband CQI value and a wideband PMI $i_2$ value in a second period 320, and a subband CQI value and a subband PMI $i_2$ value in a third period 330, as described above in reference to FIG. 3. The timing of the reporting may be as is described in reference to timeline 410 in FIG. 4. If the distance is above the threshold, then wideband properties of the communication channel 130 have changed sufficiently since the prior reporting interval. The receiver 120 selects a PTI value of 0 to feed back information about wideband properties of the channel. The receiver 120 then proceeds to feed back the selected PTI in a first period 310, a wideband PMI $i_1$ value in a second period 320, and a wideband CQI value and a wideband PMI $i_2$ value in a third period 330, as described above in reference to FIG. 3. The timing of the reporting may be described in reference to timeline 450 in FIG. 4.

Figure 6:
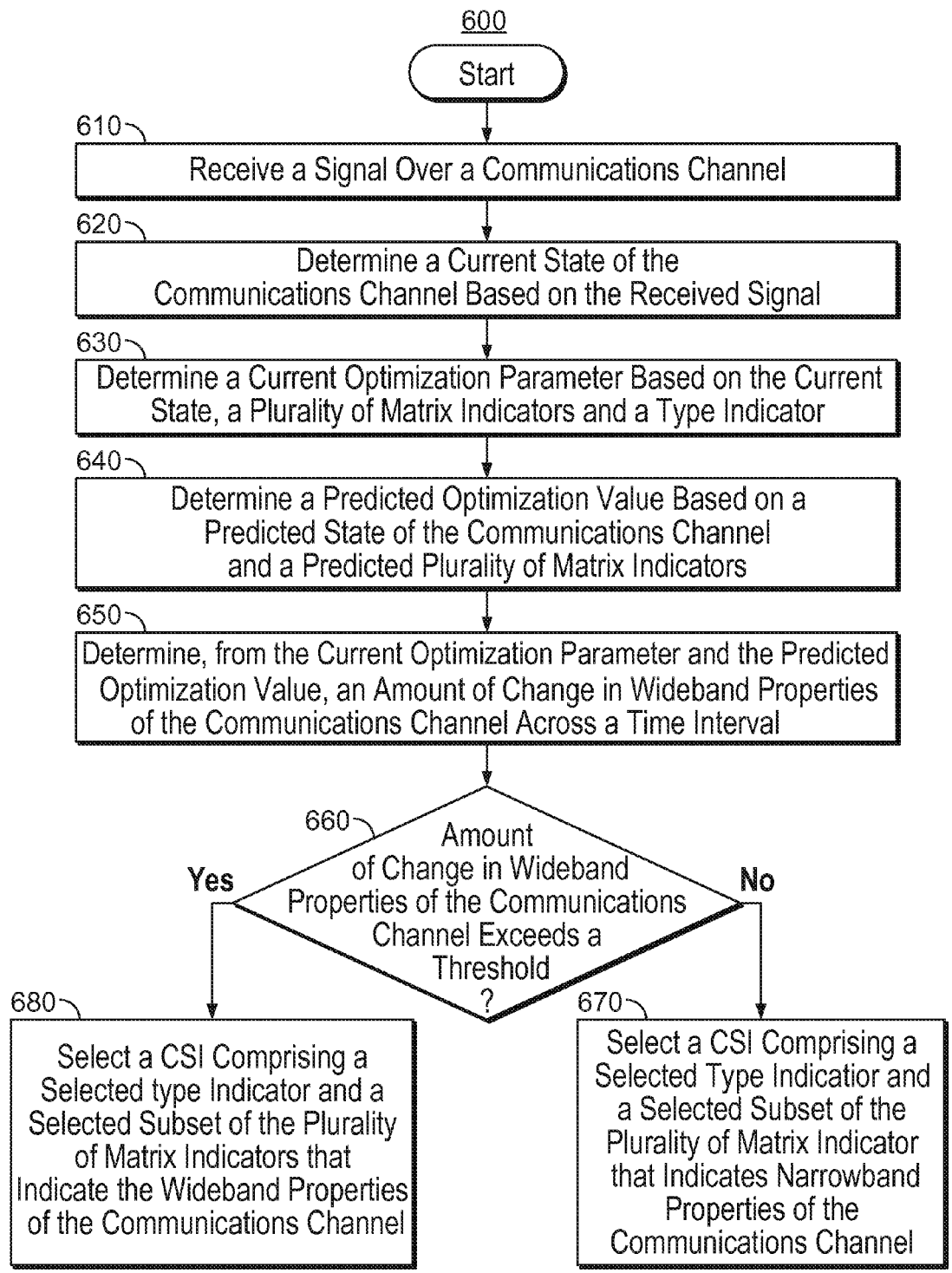
FIG. 6 is a flow chart of a process for performing a selection of a CSI based on whether an amount of change in wideband properties exceeds a threshold, in accordance with embodiments of the present disclosure.

FIG. 6 is a flow chart of a process 600 for selecting CSI based on whether an amount of change in wideband properties exceeds a threshold, in accordance with embodiments of the present disclosure.

At 610, a receiver 120 receives a signal over a communication channel. For example, a receiver 120 may receive a pilot signal from channel 130, including one or more spatial streams that have been preceded, encoded, and modulated by encoder, modulator, and precoder 115 at a transmitter 110. The preceding of the spatial streams may have been performed based on parameters from one or more layers of a codebook, as illustrated in FIG. 2.

At 620, receiver 120 determines a current state of the communication channel based on the received signal. In some embodiments, receiver 120 may model the channel H as described in reference to EQ. 3. In some implementations, receiver 120 may model the channel H as a Markovian process as described in reference to EQ. 10. Receiver 120 may update the model of the channel H.

At 630, receiver 120 determines a current optimization parameter based on the current state, a plurality of matrix indicators and a type indicator. In some embodiments, receiver 120 may select a PTI value by solving an optimization function as described in reference to EQ. 3. Receiver 120 may solve a full solution of the optimization function by using dynamic programming. Receiver 120 may determine a current optimization parameter, R. The current optimization parameter R may be based on a capacity as described in EQ. 7, or may be based on throughput as described in EQ. 8.

At 640, receiver 120 determines a predicted optimization value based on a predicated state of the communication channel, and a predicted plurality of matrix indicators. Receiver 120 may determine a predicted optimization value $V_{t+1}$ as described in reference to EQ. 4 to EQ. 6.

At 650, receiver 120 determines from the current optimization parameter and the predicted optimization value an amount of change in wideband properties of the communication channel across a time interval. In some embodiments, receiver 120 solves the optimization functions described in reference to EQ. 4 to EQ. 6. For example, in reference to EQ. 9, receiver 120 may calculate a first optimization value based on a sum of a first optimization parameter calculated using a first type indicator, and a first predicted optimization value, and may calculate a second optimization value based on a sum of a second optimization parameter calculated using a second type indicator and a second predicted optimization value.

At 660, receiver 120 determines whether an amount of change in wideband properties of the communication channel exceeds a threshold. For example, in reference to step 650, receiver 120 may compare a difference between the first optimization value and the second optimization value and determine whether the optimization value is above a threshold. If the amount of change exceeds the threshold, process 600 proceeds to 680. If the amount of change does not exceed the threshold, process 600 proceeds to 670.

At 670, receiver 120 selects a CSI comprising a selected type indicator and a subset of the plurality of matrix indicators that indicate narrowband properties of the communication channel. The receiver 120 feeds back a selected PTI of 1, to indicate narrowband properties, in a first period 310, a wideband CQI value and a wideband PMI $i_2$ value in a second period 320, and a subband CQI value and a subband PMI $i_2$ value in a third period 330, as described above in reference to FIG. 3. The timing of the reporting may be described in reference to timeline 410 in FIG. 4.

At 680, receiver 120 selects a CSI comprising a selected type indicator and a subset of the plurality of matrix indicators that indicator wideband properties of the communication channel. The receiver 120 feeds back a selected PTI of 0, to indicate wideband properties, in a first, period 310, a wideband PMI i1 value in a second period 320, and a wideband CQI value and a wideband PMI i2 value in a third period 330, as described above in reference to FIG. 3. The timing of the reporting may be described in reference to timeline 450 in FIG. 4.

Further aspects of the present invention relates to one or more of the following clauses. In some embodiments, the present disclosure relates to a method for determining channel state information in a multiple input-multiple output transmission system. The method includes receiving, at a receiver, a signal over a communication channel. An optimization value is determined based on the received signal and a plurality of matrix indicators. An amount of change, in wideband properties of the communication channel across a time interval, is determined from the optimization value. A CSI comprising a selected type indicator and a selected subset of the plurality of matrix indicators is selected based on the determined amount of change.

In some embodiments, the subset of the plurality of matrix indicators indicates the wideband properties of the communication channel when the amount of change in the wideband properties of the communication channel exceeds a predetermined threshold.

In some embodiments, the method may further include determining a current state of the communication channel based on the received signal, determining a current optimization parameter based on the current state, the plurality of matrix indicators, and the type indicator, and determining a predicted optimization value based on a predicted state of the communication channel and a predicted plurality of matrix indicators.

In some embodiments, the method may further include applying a scaling coefficient to the predicted optimization value, where the scaling coefficient adjusts a relative weight of the predicted optimization value relative to the current optimization parameter in determining the optimization value.

In some embodiments, the method may further include dividing the current optimization parameter by a first time interval, and dividing the predicted optimization value by a second time interval that is less than the first time interval.

In some embodiments, the optimization value is determined based on at least one of a capacity of the communication channel and a throughput of the communication channel.

In some embodiments, the method further includes determining the optimization value based on a first type indicator, determining a second optimization value based on a second type indicator, determining that the optimization value based on the first type indicator is greater than the second optimization value based on the second type indicator, and selecting the first type indicator as part of the selected CSI in response to determining the optimization value is greater than the second optimization value.

In some embodiments, the plurality of matrix indicators are a plurality of preceding matrix indicators, where the type indicator is a preceding type indicator, and where the selected CSI is used for preceding in a precoder of a transmitter.

In some embodiments, the present disclosure relates to a system for determining channel state information in a multiple input-multiple output transmission system. The system includes a receiver having a processor. The processor is configured to receive a signal over a communication channel and determined an optimization value based on the received signal and a plurality of matrix indicators. The processor is also configured to determine an amount of change, in wideband properties of the communication channel across a time interval, from the optimization value. The processor is also configured to select a channel state information including a selected type indicator and a selected subset of the plurality of matrix indicators based on the determined amount of change.

In some embodiments, the subset of the plurality of the matrix indicators indicates the wideband properties of the communication channel when the amount of change in the wideband properties of the communication channel exceeds a predetermined threshold.

In some embodiments, the processor is further configured to determine a current state of the communication channel based on the received signal, determine a current optimization parameter based on the current state, the plurality of matrix indicators and the type indicator. The processor is also further configured to determine a predicted optimization value based on a predicted state of the communication channel and a predicted plurality of matrix indicators.

In some embodiments, the processor is further configured to apply a scaling coefficient to the predicted optimization value, where the scaling coefficient adjusts a relative weight, of the predicted optimization value relative to the current optimization parameter in determining the optimization value.

In some embodiments, the processor is further configured to divide the current optimization parameter by a first time interval, and divide the predicted optimization value by a second time interval that is less than the first time interval.

In some embodiments, the optimization value is determined based on at least one of a capacity of the communication channel and a throughput of the communication channel.

In some embodiments, the processor is further configured to determine the optimization value based on a first type indicator, and determine a second optimization value based on a second type indicator. The processor is also further configured to determine that the optimization value based on the first type indicator is greater than the second optimization value based on the second type indicator. The processor is also further configured to select the first type indicator as part of the selected CSI, in response to determining the optimization value is greater than the second optimization value.

In some embodiments, the plurality of matrix indicators are a plurality of precoding matrix indicators, where the type indicator is a precoding type indicator, and where the selected CSI is used for preceding in a precoder of a transmitter.

In some embodiments, the processor is further configured to determine that a distance between a previously selected subset of the plurality of matrix indicators and the selected subset of the plurality of matrix indicators is greater than a predetermined threshold. The processor is further configured to select the CSI, where the CSI includes a type indicator that indicates narrowband properties of the communication channel, in response to determining that, the distance is greater than the predetermined threshold.

In some embodiments, the plurality of matrix indicators includes a first matrix indicator indicating the wideband properties of the communication channel and a second matrix indicator indicating narrowband properties of the communication channel.

The foregoing describes systems and methods for reliable and efficient information transmission. Those skilled in the art will appreciate that the disclosed methods and systems can be practiced by other than the described embodiments, which are presented for the purpose of illustration rather than of limitation. Modifications and variations are possible in light of the above teachings or may be acquired from practice of the disclosed methods and systems. While certain components of this disclosure have been described as implemented in hardware and others in software, other configurations may be possible.

What is claimed is:

1. A method for determining channel state information (CSI) in a multiple input-multiple output transmission system, the method comprising:
   receiving, at a receiver, a signal over a communication channel;
   determining an optimization value based on the received signal and a plurality of matrix indicators;
   determining, from the optimization value, an amount of change in wideband properties of the communication channel across a time interval;
   selecting, based on the determined amount of change, a CSI comprising a selected type indicator and a selected subset of the plurality of the matrix indicators, wherein the subset of the plurality of matrix indicators indicates the wideband properties of the communication channel when the amount of change in the wideband properties of the communication channel exceeds a threshold.

2. The method of claim 1, wherein the threshold is a predetermined threshold.

3. The method of claim 1, wherein the determining the optimization value comprises:
   determining a current state of the communication channel based on the received signal;

determining a current optimization parameter based on the current state, the plurality of matrix indicators, and the type indicator; and determining a predicted optimization value based on a predicted state of the communication channel and a predicted plurality of matrix indicators.

4. The method of claim 3, further comprising:

applying a scaling coefficient to the predicted optimization value, wherein the scaling coefficient adjusts a relative weight of the predicted optimization value relative to the current optimization parameter in determining the optimization value.

5. The method of claim 3, further comprising:

dividing the current optimization parameter by a first time interval; and dividing the predicted optimization value by a second time interval that is less than the first time interval.

6. The method of claim 1, wherein the optimization value is determined based on at least one of a capacity of the communication channel and a throughput of the communication channel.

7. The method of claim 1, further comprising:

determining the optimization value based on a first type indicator;

determining a second optimization value based on a second type indicator;

determining that the optimization value based on the first type indicator is greater than the second optimization value based on the second type indicator; and in response to determining the optimization value is greater than the second optimization value, selecting the first type indicator as part of the selected CSI.

8. The method of claim 1, wherein the plurality of matrix indicators are a plurality of precoding matrix indicators, wherein the type indicator is a precoding type indicator, and wherein the selected CSI is used for precoding in a precoder of a transmitter.

9. The method of claim 1, wherein the determining the optimization value further comprises:

determining that a distance between a previously selected subset of the plurality of matrix indicators and the selected subset of the plurality of matrix indicators is greater than a predetermined threshold; and in response to determining that the distance is greater than the predetermined threshold, selecting the CSI, wherein the CSI comprises a type indicator that indicates narrowband properties of the communication channel.

10. The method of claim 1, wherein the plurality of matrix indicators comprises a first matrix indicator indicating the wideband properties of the communication channel and a second matrix indicator indicating narrowband properties of the communication channel.

11. A system for determining channel state information (CSI) in a multiple input-multiple output transmission system, the system comprising:

a receiver having a processor, wherein the processor is configured to:

receive, at a receiver, a signal over a communication channel;

determine an optimization value based on the received signal and a plurality of matrix indicators;

determine, from the optimization value, an amount of change in wideband properties of the communication channel across a time interval;

select, based on the determined amount of change, a CSI comprising a selected type indicator and a selected subset of the plurality of the matrix indicators, wherein the subset of the plurality of the matrix indicators indicates the wideband properties of the communication channel when the amount of change in the wideband properties of the communication channel exceeds a threshold.

12. The system of claim 11, wherein the threshold is a predetermined threshold.

13. The system of claim 11, wherein the processor is configured to:

determine a current state of the communication channel based on the received signal;

determine a current optimization parameter based on the current state, the plurality of matrix indicators, and the type indicator; and determine a predicted optimization value based on a predicted state of the communication channel and a predicted plurality of matrix indicators.

14. The system of claim 13, wherein the processor is further configured to:

apply a scaling coefficient to the predicted optimization value, wherein the scaling coefficient adjusts a relative weight of the predicted optimization value relative to the current optimization parameter in determining the optimization value.

15. The system of claim 13, wherein the processor is further configured to:

divide the current optimization parameter by a first time interval; and divide the predicted optimization value by a second time interval that is less than the first time interval.

16. The system of claim 11, wherein the optimization value is determined based on at least one of a capacity of the communication channel and a throughput of the communication channel.

17. The system of claim 11, wherein the processor is further configured to:

determine the optimization value based on a first type indicator;

determine a second optimization value based on a second type indicator;

determine that the optimization value based on the first type indicator is greater than the second optimization value based on the second type indicator; and select the first type indicator as part of the selected CSI, in response to determining the optimization value is greater than the second optimization value.

18. The system of claim 11, wherein the plurality of matrix indicators are a plurality of precoding matrix indicators, wherein the type indicator is a precoding type indicator, and wherein the selected CSI is used for precoding in a precoder of a transmitter.

19. The system of claim 11, wherein the processor is configured to:

determine that a distance between a previously selected subset of the plurality of matrix indicators and the selected subset of the plurality of matrix indicators is greater than a predetermined threshold; and in response to determining that the distance is greater than the predetermined threshold, select the CSI, wherein the CSI comprises a type indicator that indicates narrowband properties of the communication channel.

20. The system of claim 11, wherein the plurality of matrix indicators comprises a first matrix indicator indicating the wideband properties of the communication channel and a second matrix indicator indicating narrowband properties of the communication channel.

* * * * *